(12) United States Patent
Bauman

(10) Patent No.: US 8,457,606 B2
(45) Date of Patent: Jun. 4, 2013

(54) METHOD AND SYSTEM FOR MULTI-NETWORK TELEPHONE CALLING

(76) Inventor: Binyamin Bauman, Passaic, NJ (US)

( * ) Notice: Subject to any disclaimer, the term of this patent is extended or adjusted under 35 U.S.C. 154(b) by 0 days.

(21) Appl. No.: 12/916,703

(22) Filed: Nov. 1, 2010

(65) Prior Publication Data

US 2012/0046013 A1 Feb. 23, 2012

Related U.S. Application Data

(63) Continuation-in-part of application No. 12/603,461, filed on Oct. 21, 2009.

(51) Int. Cl.
- *H04M 3/42* (2006.01)
- *H04M 1/00* (2006.01)
- *H04M 11/00* (2006.01)
- *H04B 1/38* (2006.01)
- *H04L 12/66* (2006.01)
- *H04J 3/16* (2006.01)
- *H04J 3/22* (2006.01)

(52) U.S. Cl.
USPC ........ 455/414.1; 370/466; 370/352; 455/560; 379/93.05

(58) Field of Classification Search
USPC ........... 455/406, 411, 439, 466, 127.5, 552.1, 455/432.1
See application file for complete search history.

(56) References Cited

U.S. PATENT DOCUMENTS

| | | | | |
|---|---|---|---|---|
| 6,931,249 | B2 * | 8/2005 | Fors et al. | 455/436 |
| 7,733,901 | B2 * | 6/2010 | Salkini et al. | 370/466 |
| 2001/0036255 | A1 * | 11/2001 | Reformato et al. | 379/88.01 |
| 2005/0025134 | A1 * | 2/2005 | Armistead | 370/352 |
| 2006/0018448 | A1 * | 1/2006 | Stevens et al. | 379/93.05 |
| 2008/0261603 | A1 * | 10/2008 | Sever et al. | 455/445 |

* cited by examiner

*Primary Examiner* — Michael Faragalla
*Assistant Examiner* — Nathan Brittingham
(74) *Attorney, Agent, or Firm* — Davidson Berquist Jackson & Gowdey, LLP

(57) ABSTRACT

Methods and systems are provided to connect telephone calls, such as international phone calls, using data and telephone networks of a mobile communication device such as a cellular phone. A routing engine determines from the available communications interfaces (e.g., a cellular voice interface, a cellular data interface, and non-cellular data interfaces such as WiFi and WiMax) and from a set of user preferences what type of routing should be used for an outbound call. For example, call routing can be performed using VoIP calls over non-cellular networks, VoIP calls over cellular data networks, voice calls using substitute number termination, voice calls using calling card routing, voice calls using bridge-based calling and conventional cellular voice calls.

5 Claims, 7 Drawing Sheets

METHOD AND SYSTEM FOR MULTI-NETWORK TELEPHONE CALLING

CROSS-REFERENCE TO RELATED APPLICATIONS

This application is a continuation-in-part of U.S. patent application Ser. No. 12/603,461, filed Oct. 21, 2009, the contents of which are incorporated herein by reference

BACKGROUND OF THE INVENTION

1. Field of the Invention

This application generally relates to mobile telephony, and, in at least one embodiment, to an application on a mobile device for connecting a telephone call using a number of different data and telephone network connection technologies.

2. Discussion of the Background

Mobile telephones recently have become significantly more common and provide increasingly advanced technology and functionality. These phones provide convenient communication for users around the world. However, mobile phones can have expensive and/or complicated billing plans for charging the users.

Many mobile telephone plans do not charge the caller extra for dialing locally or even anywhere inside the caller's country. Many users do not, however, have international calling activated or available on their mobile phone plans, and cannot make international phone calls from their phones. Even those mobile telephone users that do have international calling activated on their phones may incur expensive charges for each individual international or long distance telephone call.

Telephone calling cards may provide a convenient way for business, residential and mobile telephone users to charge the costs of telecommunications services separate from their phone service plans. Conventional voice calling card services may be used to reduce communication costs and manage call accounting records. As the landscape of telecommunications changes, retail pre-paid calling cards have become popular in some markets, especially for international calling. One reason for this popularity is due to significantly higher long distance calling rates for international calls when compared to national long distance calling rates for private subscriber accounts.

However, these cards typically require a user to call a phone number and then enter a separate calling card code number as well as the destination phone number. Upon validation of the calling card code number, a connection between the subscriber and the called party is established. Notably, they do not permit automatic dialing without the added delay and inconvenience of entering multiple sets of numbers. Accordingly, there is a desire for a method and system to permit easy, efficient and automatic long-distance or international calling, avoid the full cost of these calls, and provide flexibility in paying for the service.

In accordance with methods and systems consistent with the present invention, a method in a data processing system is provided for placing a telephone call, comprising receiving a destination phone number to call, determining what technologies are available for placing the call, determining a technology by which the user would like to place the call, and placing the call using the user-specified technology.

BRIEF DESCRIPTION OF THE DRAWINGS

The following description, given with respect to the attached drawings, may be better understood with reference to the non-limiting examples of the drawings, wherein.

DETAILED DESCRIPTION

Figure 1:
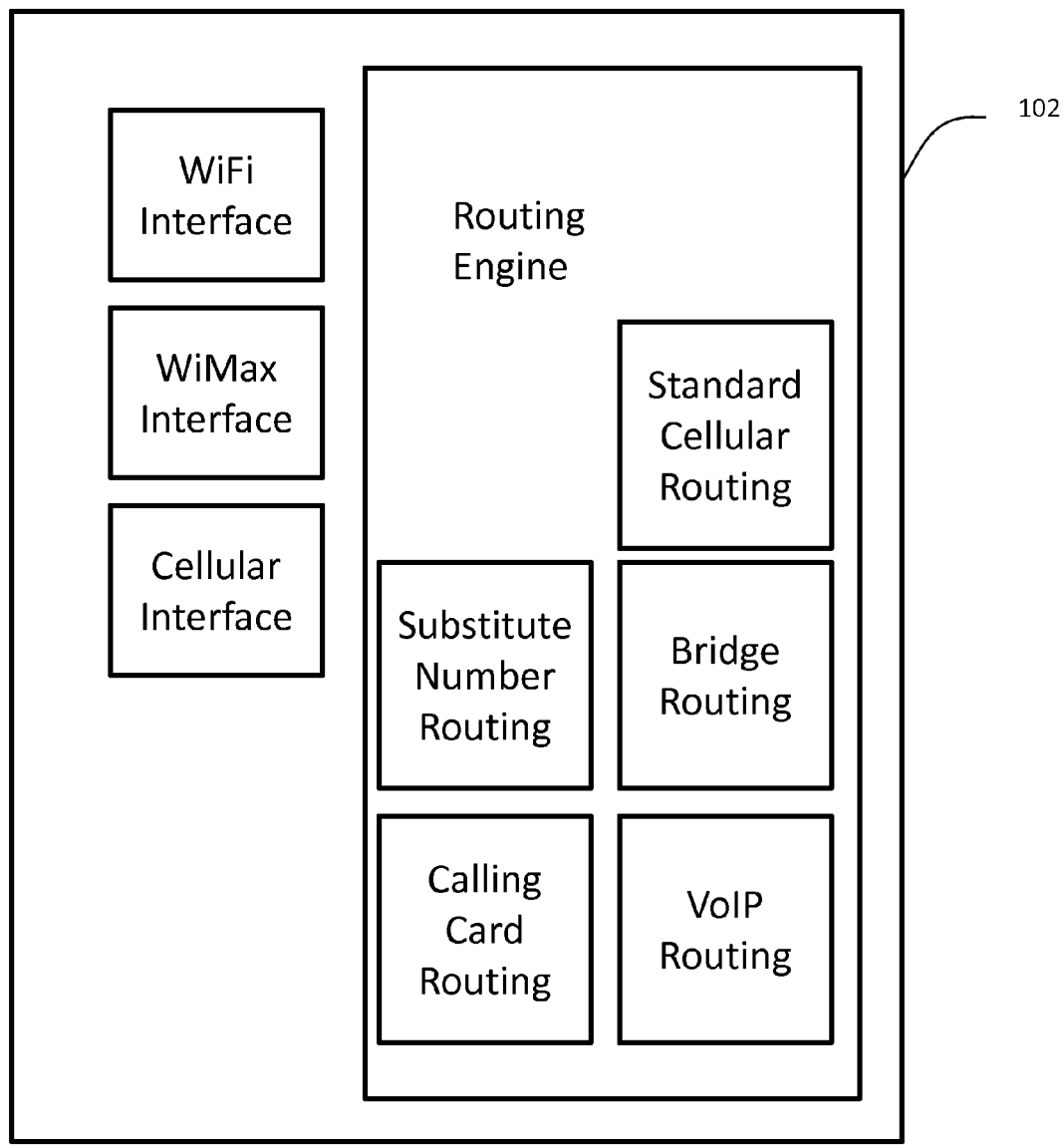
FIG. 1 is a block diagram of various components of a mobile phone that allow the mobile phone to conduct telephone conversations using a number of different technologies.

Many modern mobile communications devices (e.g., mobile phones, PDAs and smart phones) have data capabilities and access data networks in addition to their regular calling capabilities over telephone networks. Methods and systems in accordance with the present invention connect telephone calls, such as international phone calls, using a number of different possible technologies depending on what technologies are available at the time the call is being placed and what the relative costs/priorities are of using the available technologies.

As described herein, there are at least five different possible technologies for routing calls using a mobile phone application (including a routing engine) running on a mobile communications device. The first technology is a standard wireless (cellular) routing which enables the mobile communications device to make calls on conventional cellular networks (GSM, CDMA, etc.). However, fee-based calls, especially international calls, made using conventional wireless routing can be extremely costly. Thus, where possible, the routing engine of a mobile communications device may instead select a less costly alternative.

A second routing technology is substitute termination number routing. Using substitute termination number routing, a call to the destination phone number is instead routed through a non-international temporary phone number, thereby saving the cost of an international phone call on the mobile phone plan associated with the mobile phone. In one implementation (as described in greater detail below), the routing engine on the mobile phone uses the data network to automatically request and receive the temporary phone number, and the routing engine automatically sets up a call on the telephone network to the substitute termination number, which in turn routes the call to the desired (international) telephone number.

Thus, the mobile phone application that runs on the mobile phone emulates single-stage dialing using a calling card-like system, thus providing the user experience of single-stage dialing while providing the advantages of a calling card for international calls. Since many callers do not have different rates for calling within a country, e.g., the U.S., the user of the substitute termination number realizes the advantage of using non-international minutes on their calling plan to call the substitute termination number from anywhere in the country for the same non-international price.

A third routing technology that can be selected by the routing engine is bridge routing. Using this technology, which is often less expensive than conventional cellular calling to an international number, but which may be more expensive than substitute number routing, a routing engine uses the data network to request that a bridge be set-up to link the called number and the number of the mobile communications device. As a result, the mobile communications device receives a call from the bridge, and the bridge makes an out-bound call to the called number. The routing through the bridge can be made transparent to the user by having the mobile phone application disable the ringing of the telephone when it is from the bridge and automatically pick up the call from the bridge. By using such a technique, it will appear to the user that the telephone call made an outgoing call rather than receiving an incoming call. In fact, the mobile phone application may play a ringing sound (or other tone) to the user while waiting for the calls to connect so that the user understands that a call is in progress. The mobile phone application can also reject any incoming calls from other numbers while waiting for the call from the bridge.

A fourth routing technology that can be selected by the routing engine is calling card routing. Using this technology, a routing engine places a call to a known number corresponding to the access point for a calling card (or for a specified calling card of a set of calling cards). The mobile phone application then can automatically enter (e.g., using DTMF tones) the account and PIN information corresponding to the user of the phone such that the user becomes authenticated. The mobile phone application then can automatically enter the destination phone number on behalf of the user, and the call is connected to the destination phone number. The mobile phone application can mute the transmission of the account, PIN and destination number so that the call appears to the user to be a conventional call.

In an alternate embodiment, to reduce the delay that would normally be associated with the mobile phone application having to enter the DTMF tones for the account number, PIN and destination telephone number, the mobile phone application may transmit to the calling card platform, via the data network, account and call setup information corresponding to the outgoing call, as well as the telephone number of the mobile communications device that will be calling the calling card platform. Thus, when the calling card platform receives a call from the mobile communications device, the calling card platform will be able to bypass the normal account authorization and destination telephone number processing. For added security, the communications between the mobile phone application and the calling card platform are preferably encrypted. However, for even greater security, the call setup information sent over the data network could exclude some information (e.g., the PIN) which would then automatically (and transparently to the user) be entered by the mobile phone application upon connection to the calling card platform.

In such a configuration where the mobile phone application communicates via the data network with the calling card platform, the calling card platform can inform the mobile phone application of important information (e.g., costs for routing to the destination, and amount of time and/or money remaining), such that the mobile phone application can provide information to the user of the mobile phone application without it being heard by the callee. For example, the mobile phone application may receive a message that the calling card needs to be replenished and provide an interface for agreeing to a replenishment and how much the replenishment should be (as described in greater detail below).

A fifth routing technique that can be selected by the routing engine is voice-over-IP-based routing. This technique utilizes data network connections to carry voice instead of using the conventional voice connections of the cellular network. For those users without data usage limitations, this calling option can be extremely cost effective. For example, if the callee also is utilizing a VoIP-calling system, there may not be any charge at all as the public switched telephone network may never need to be used. If the call, however, is to a "land line," typically, a call is routed to the closest or least expensive gateway connected to the public switched telephone network which then completes the call to the land line.

With many modern cellular calling plans, there can be data usage charges such that VoIP over the cellular data network may not be economical. However, traditionally VoIP over non-cellular data networks (e.g., WiFi or WiMax) can be extremely cost effective (and even free), but the quality of the call may suffer due to the routing over the packet switched network. Thus, there may be times that the call quality is not sufficient for the user's needs.

Methods and systems in accordance with the present invention provide a way to avoid the full cost of an international call, permit mobile phone users without international calling plans to make international calls, and automatically connect to an international destination number. Additionally, since the call does not incur additional charges on a typical mobile plan, the international portion of the call may be billed to a separate account, thereby providing flexibility for funding the account. For example, the user may prepay the account via any suitable method, receive a bill, charge it to a credit card, avoid monthly bills from their mobile phone company, and/or share funding of the account. The use of the data network to automatically set up the necessary connections permits connection of the call without the user needing to enter additional information besides the destination telephone number.

The mobile communication device, such as a cellular phone, PDA, smart phone or other suitable device, includes an application that runs on the device, such as an iPhone application running on an Apple iPhone. The application may set up calls in conjunction with a calling card product such as PennyTalk, for example. The application sets up telephone calls using the dual-network device, including a data network and a telephony network (which may be Voice over Internet Protocol (VoIP), wired public switched telephone network (PSTN) or wireless telephone network, for example.)

Generally, the mobile phone application receives the desired international destination phone number from the user, exchanges data with a network control point which provides a means to set up the desired telephone call. To receive the destination number from the user, the mobile phone application may present a user interface that resembles a telephone calling application or interface. Upon receipt, the mobile phone application supplies the destination phone number and optionally the calling party's number (CPN) and an account number to the network control point over the data network. For example, in the substitute termination number (STN) implementation, the network control point returns a STN over the data network to the mobile phone application, and also signals the service provider's server (on the service provider's telephone network) hosting the STN to provision a calling application to be prepared for the receipt of a phone call to the substitute termination phone number. The mobile phone application then relays the STN to the phone calling application on the mobile phone that dials regular phone calls. In response, the phone calling application dials the STN over the telephone network. Upon receipt of the call by the STN, the service provider calling application dials the international number, and upon answering, bridges the call to connect the mobile phone to the international destination number.

Figure 2:
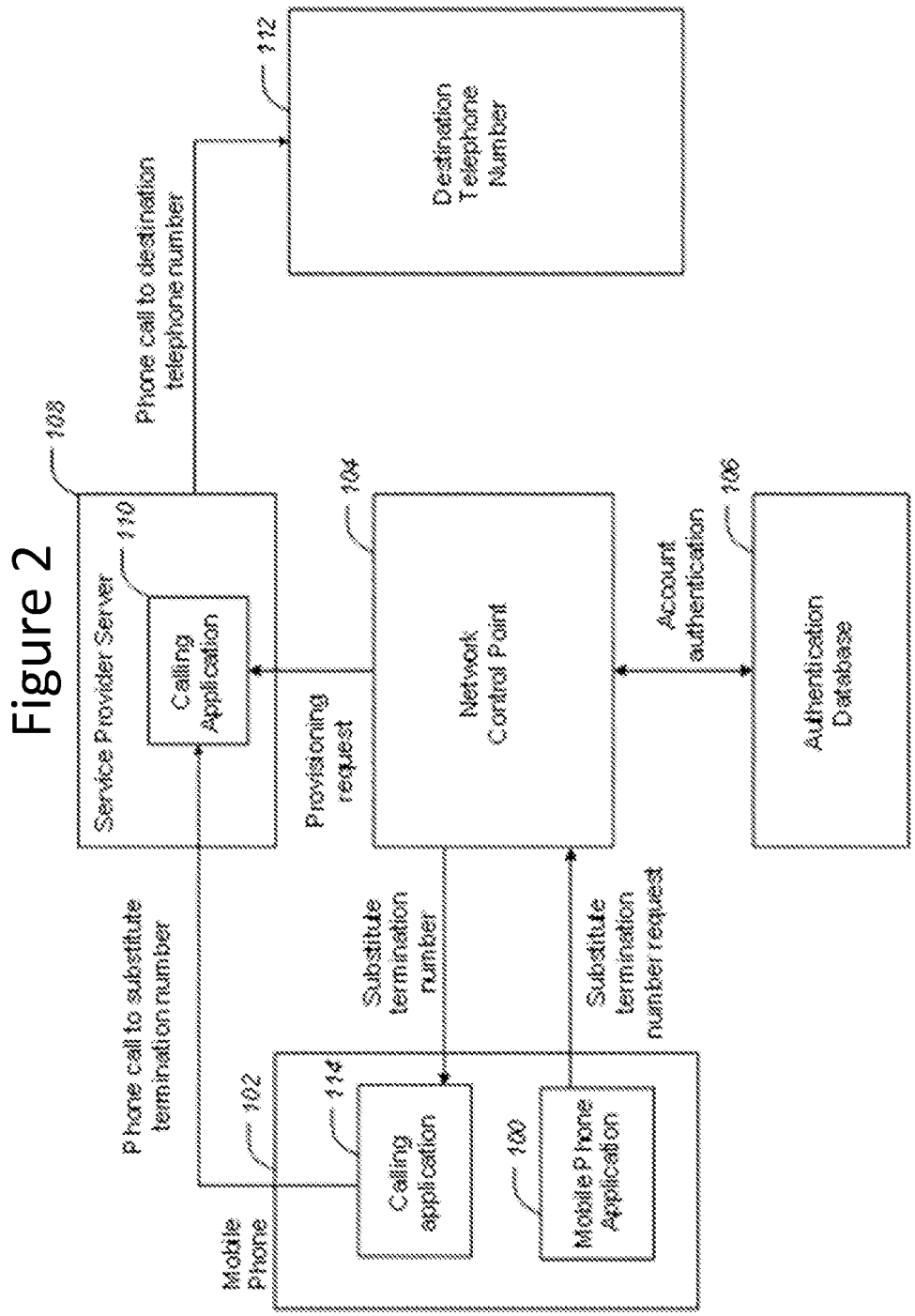
FIG. 2 illustrates a mobile phone, data network and telephone network in accordance a substitute termination number routing technology.
Figure 3:
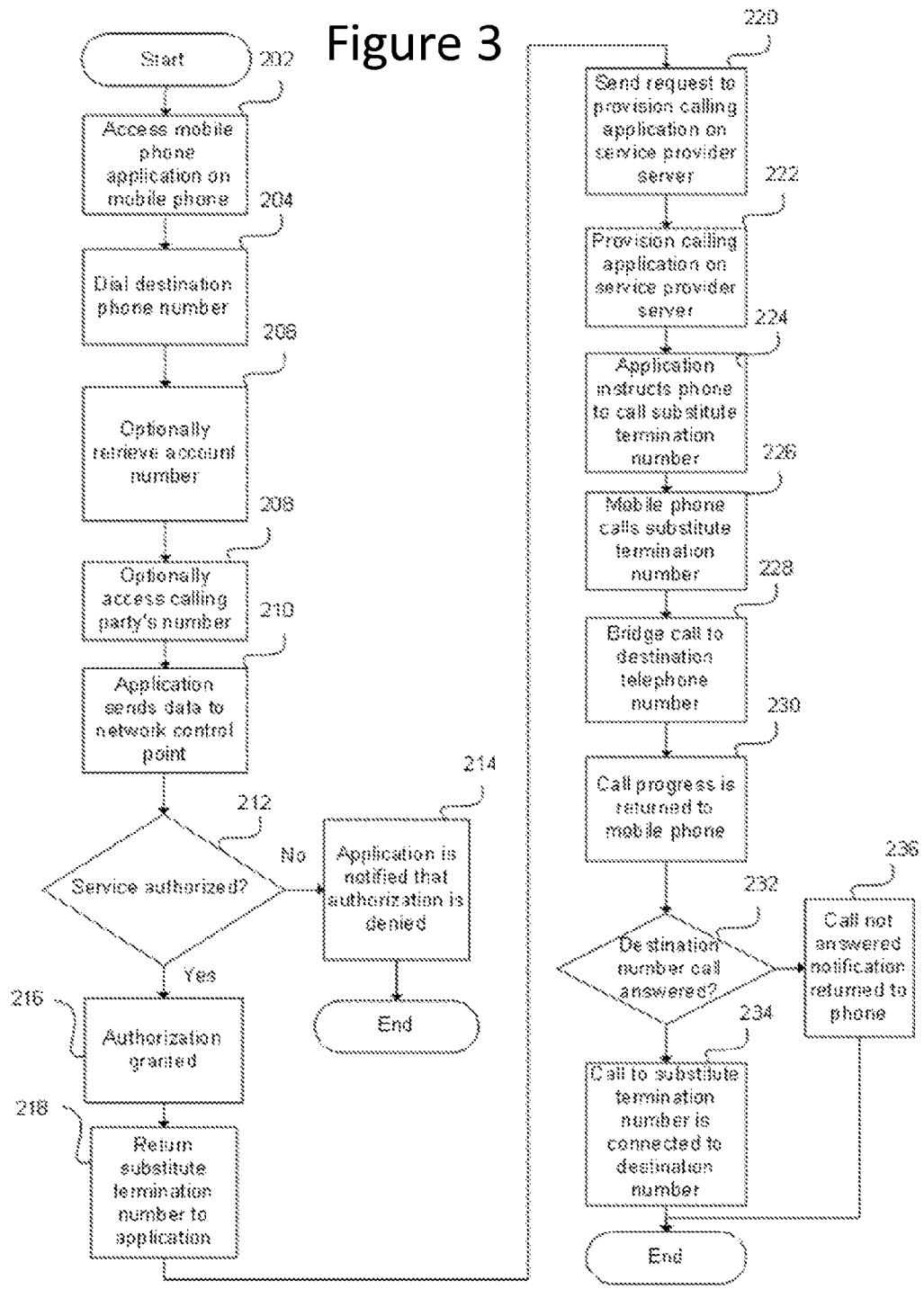
FIG. 3 depicts a method of routing a call in accordance a substitute termination number routing technology.

FIG. 2 illustrates a mobile phone, a telephone network and at least one data network in accordance methods and systems consistent with the present invention. FIG. 3 depicts steps in an exemplary method for placing a phone call using the multiple networks in accordance with an embodiment consistent with the present invention, and is discussed below in conjunction with FIG. 2. First, a mobile phone user accesses the mobile phone application 100 on the mobile phone 102 (step 202). In one embodiment, the mobile phone application 100 may be a mobile phone software application, such as in iPhone application, and may run on the mobile phone 102 having a processor that runs the software application. It may also be a hardware component or any combination of hardware or software. Additionally, the phone 102 may be a mobile phone or non-mobile phone such as a residential landline telephone, or any other suitable communication device.

The mobile phone application 100 may present an interface for the user to enter the desired international destination telephone number (TN) 112. In other implementations, the mobile phone application 100 may work with a peripheral device that presents a physical telephone keypad to the user, or may receive the phone number via the telephone keypad on the mobile phone 102. The mobile phone application 100 may use either this keypad or the calling application user interface (such as a soft keypad) to collect the TN 112 from the user. The user dials the TN 112 on the keypad (step 204). The mobile phone application 100 may use an address book, contact list, voice recognition or some other method of allowing the user to select a TN 112 without entering the digits on the keypad. Although typically described as being an international phone call, the call destination 112 can be anywhere including international, national or local call destinations. The TN 112 may represent a communication device and/or a server on a service provider network hosting the destination telephone number.

In one implementation, in addition to the destination phone number 112, the mobile phone application 100 may request and/or require a user identifier such as an account number that can be validated, authenticated, and billed by the network control point (step 206). The account number may be used to associate the user with an account for the purposes of billing and may have, for example, a prepaid balance. The account number may be stored on the mobile phone 102. The mobile phone application 100 may provide service without a user identifier, whereas some other accounting and billing arrangement may exist. Additionally, the mobile phone application 100 optionally accesses the CPN (step 208). The mobile phone application 100 may use the CPN from the mobile phone 102 as a means to restrict or control some aspects of usage of the mobile phone application 100 at the network control point. For example, the calling application 110 provisioned to run on the STN may only allow usage when the call is signaled to have been placed from the CPN.

The mobile phone application 100 must then determine how the call to the destination number is to be routed. By using the various communications interfaces (e.g., WiFi, WiMax and cellular), the mobile phone application 100 can determine which interfaces are available for use. For example, if WiFi and WiMax networks are not available, then placing calls over those types of networks will not be possible. Similarly, if a data network is also not available using the cellular interface, then substitute number routing and bridge routine may not be available, but calling card routing is still possible. Thus, the mobile phone application can utilize calling card routing to reduce costs compared with standard cellular routing.

If a cellular-based data network is available, but there are not WiFi or WiMax networks available, the mobile phone application can utilize any of the call routing options that have been authorized by the user. An example will now be given assuming that the user has disabled VoIP calls over the cellular data network (e.g., because the caller does not have an unlimited data plan). In the example, the mobile phone application may determine that the least expensive call routing option is the substitute number routing.

As shown in FIG. 3, the mobile phone application 100 then sends the data including, for example, the TN 112, CPN, and account number to the network control point 104 over the data network (step 210). Upon receipt of the data from the mobile phone application 100, the network control point 104 validates the account number to authorize service (step 212). In doing so, the network control point 104 accesses an authentication database 106 that may be located remotely. If authentication is denied, the network control point 104 notifies the mobile phone application (step 214). If authentication is granted (step 216), the network control point 104 returns a STN to the mobile phone application 100 for call signaling and bridging to the destination telephone number 112 (step 218).

The network control point 104 also sends a request to a service provider server 108 having the STN to provision a calling application 110 on the server to prepare for an incoming call (step 220). From the information gathered at and received from the network control point 104, the service provider server 108 hosting the STN provisions the calling application 110 hosted on the server to expect an inbound call request and, when that call arrives, to bridge the call to the TN 112 (step 222). The provisioning may include inserting the relevant data into a database table and being prepared to run a call bridging application to the telephone number TN 112. Generally, the service provider's network provides an infrastructure for the telephone network, and the service provider servers 108 run call control applications to control telephone calls.

Figure 4:
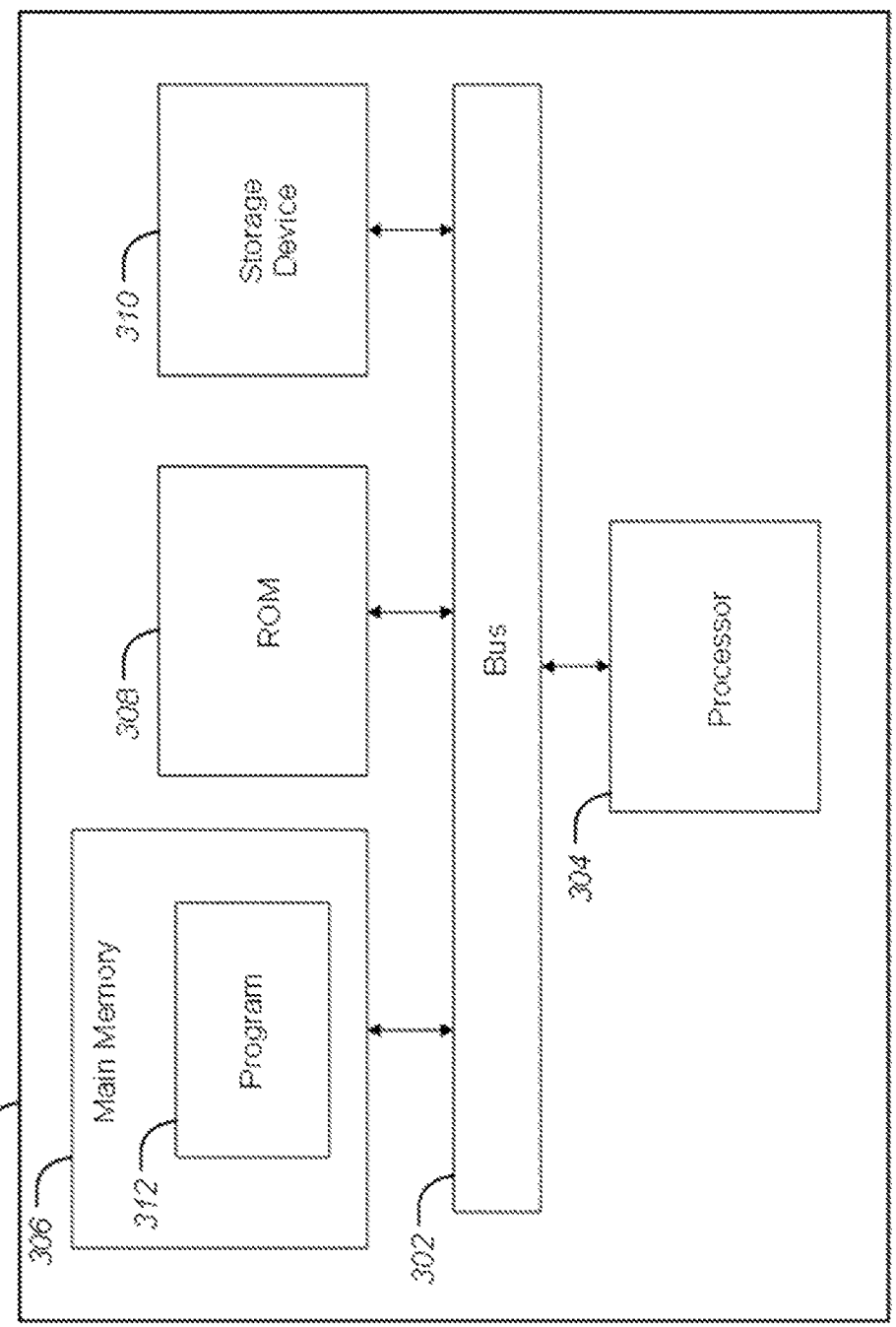
FIG. 4 depicts a network control point server in accordance with methods and systems consistent with the present invention.

FIG. 4 depicts an exemplary network control point server in accordance with methods and systems consistent with the present invention. The network control point 104 may be a server, computer or any other suitable device accepting and sending data packets over a network. Other components described herein, such as the service provider server 108, authentication database 106 and destination telephone number server 112 may have the same or similar components as described below. The mobile phone 102 may also have components that operate similarly but on a smaller scale. Additionally, there may be many more network control points 104, service provider servers 108, mobile phones 102, authentication databases 106 or any other components than are shown on FIG. 2.

In one implementation, the network control point 104 includes a bus 302 or other communication mechanism for communicating information, and a processor 304 coupled with bus 302 for processing the information. The network control point 104 also includes a main memory 306, such as a random access memory (RAM) or other dynamic storage device, coupled to the bus 302 for storing information and instructions to be executed by the processor 304. In addition, the main memory 306 may be used for storing temporary variables or other intermediate information during execution of instructions to be executed by processor 304. The main memory 306 includes a program 312 for implementing processing consistent with methods and systems in accordance with the present invention. The network control point 104 further includes a Read-Only Memory (ROM) 308 or other static storage device coupled to the bus 302 for storing static information and instructions for the processor 304. A storage device 310, such as a magnetic disk or optical disk, is provided and coupled to bus 302 for storing information and instructions.

According to one embodiment, the processor 304 executes one or more sequences of one or more instructions contained in the main memory 306. Such instructions may be read into the main memory 306 from another computer-readable medium, such as the storage device 310. Execution of the sequences of instructions in the main memory 306 causes the processor 304 to perform processes described herein. One or more processors in a multi-processing arrangement may also be employed to execute the sequences of instructions contained in the main memory 306. In alternative embodiments, hard-wired circuitry may be used in place of or in combination with software instructions. Thus, embodiments are not limited to any specific combination of hardware circuitry and software.

Although described relative to the main memory 306 and the storage device 310, instructions and other aspects of methods and systems consistent with the present invention may reside on another computer-readable medium, such as a floppy disk, a flexible disk, hard disk, magnetic tape, a CD-ROM, magnetic, optical or physical medium, a RAM, a PROM, and EPROM, a FLASH-EPROM, any other memory chip or cartridge, or any other medium from which a computer can read, either now known or later discovered.

Referring back to FIG. 3, upon receipt of the STN from the network control point 104, the mobile phone application 100 instructs the local mobile telephone 102 to place a call to the STN over the PTSN network (step 224). In doing so, the mobile phone application 100 may use the regular calling application 114 or functionality of the mobile phone 102. This calling application 114 may be hardware or software or a combination of both. When the local mobile phone 102 calls the STN (step 226), the call routes to the server 108 of the service provider providing the STN. The service provider server 108 includes the calling application 110 that has been provisioned to be prepared for the incoming call. When the call request signaling for the call to the STN arrives at the service provider application, the service provider application 110 initiates a call to the TN 112 by generating call setup signaling (step 228).

The service provider application 110 bridges call progress information from the TN call setup to the STN call setup log. This replicates call progress information—such as signaling that indicates the phone is ringing—received by the service provider application 110 setting up the call to the TN 112 back to the mobile phone 102. Call progress information, e.g., the phone is ringing, may be given back to the mobile telephone 102 while the call to the TN 112 is in progress (step 230). In one implementation, the service provider server application 110 does not answer the first call received from the mobile telephone 102 until the second call to the TN 112 is answered. If the call to the TN 112 completes (step 232), the service provider application completes the STN call (step 234) and signals the bridging of the bearer channel to the mobile phone 102. During the call, the call connection stays routed through the service provider server 108 on which the service provider application 110 resides. If the call to the TN 112 does not complete (step 232), the service provider application terminates the STN call (step 236) and signals the termination with the cause code of the TN call.

Various implementations and variations may be used. In one implementation, the service provider provisioning of the calling application 110 on the STN from the network control point information is temporary, and the provisioning expires after a short period of time. In addition, the STN may use the CPN from the call into the STN as validation criteria checked against the calling party number information delivered in the network control point's signaling to the STN. In another implementation, the STN may be toll-free or non-toll-free. Toll-free numbers are more likely to receive the CPN and provide no impact on the end-user's service plan or billing plan.

Furthermore, the selection of a best STN to use may involve value-oriented algorithms and processes that may use information such as the CPN, the account number, time of day, location, and TN destination 112. For example, a STN local to the caller may be selected. The call to the TN 112 from the service provider may be a VoIP call or a PSTN call.

Another implementation in accordance with the present invention involves the use of a durable intermediary phone number as opposed to a temporary one. In this embodiment, the calling process is similar to the above process, except that the STN is replaced with a durable substitute termination number (DSTN). In this example, the provisioning of the application on the service provider server having the DSTN is not temporary; it is durable. The DSTN is retained by the mobile phone application for use in future calls to the destination telephone number 112. In one implementation, the use of the DSTN requires the CPN for the service provider server 108 to distinguish between different callers, and access to the calling application 110 at the service provider server 108 uses the CPN for validation. In this implementation, original or subsequent calls using the DSTN are made directly to the DSTN without set up through the network control point 104. The process may be similar to the process described in FIG. 2, except, in one implementation, skipping from step 204 to step 226 on calls subsequent to the first call or after an account information initialization.

Figure 5:
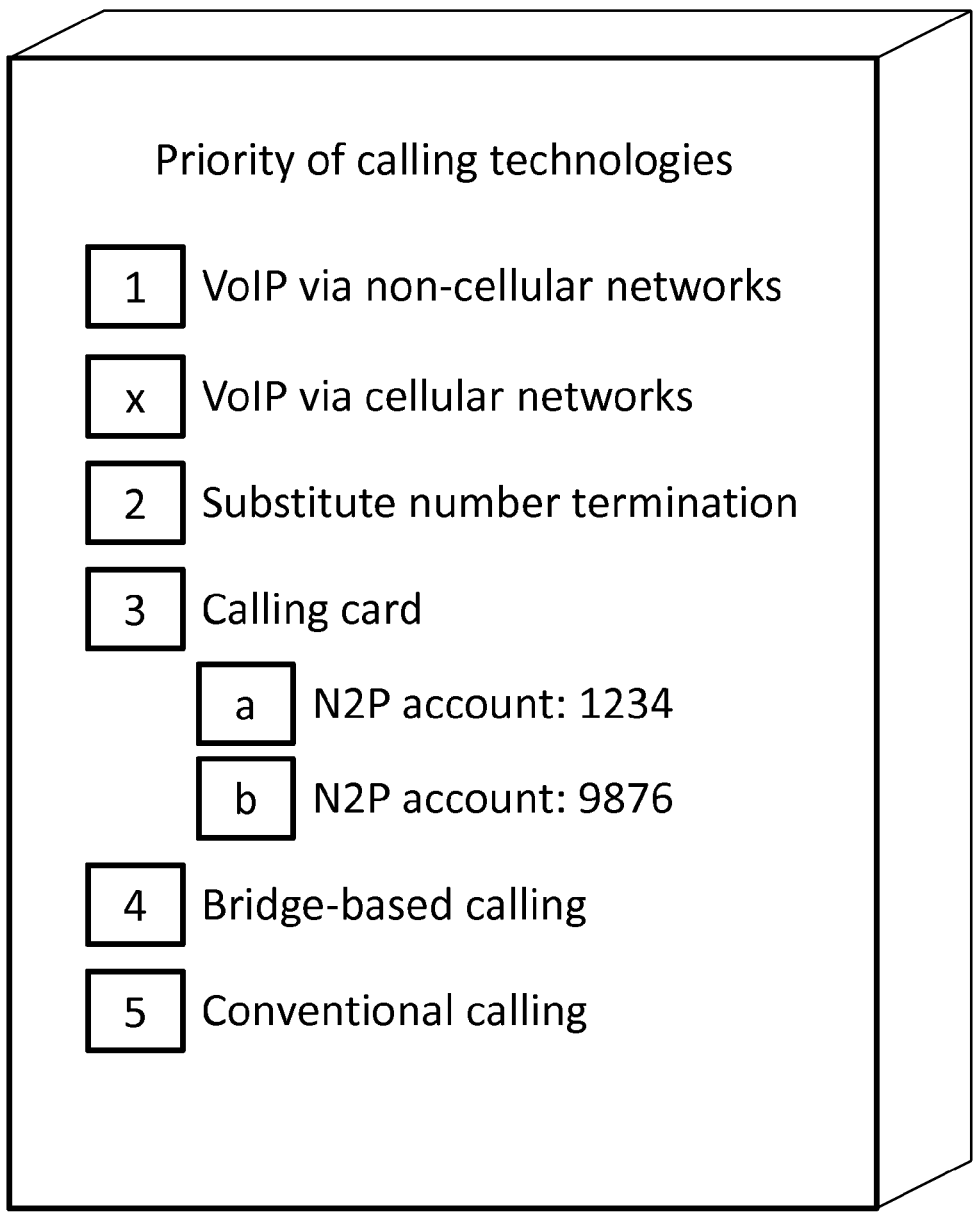
FIG. 5 is a first exemplary interface for a mobile communications device for specifying relative priorities of call routing.
Figure 6:
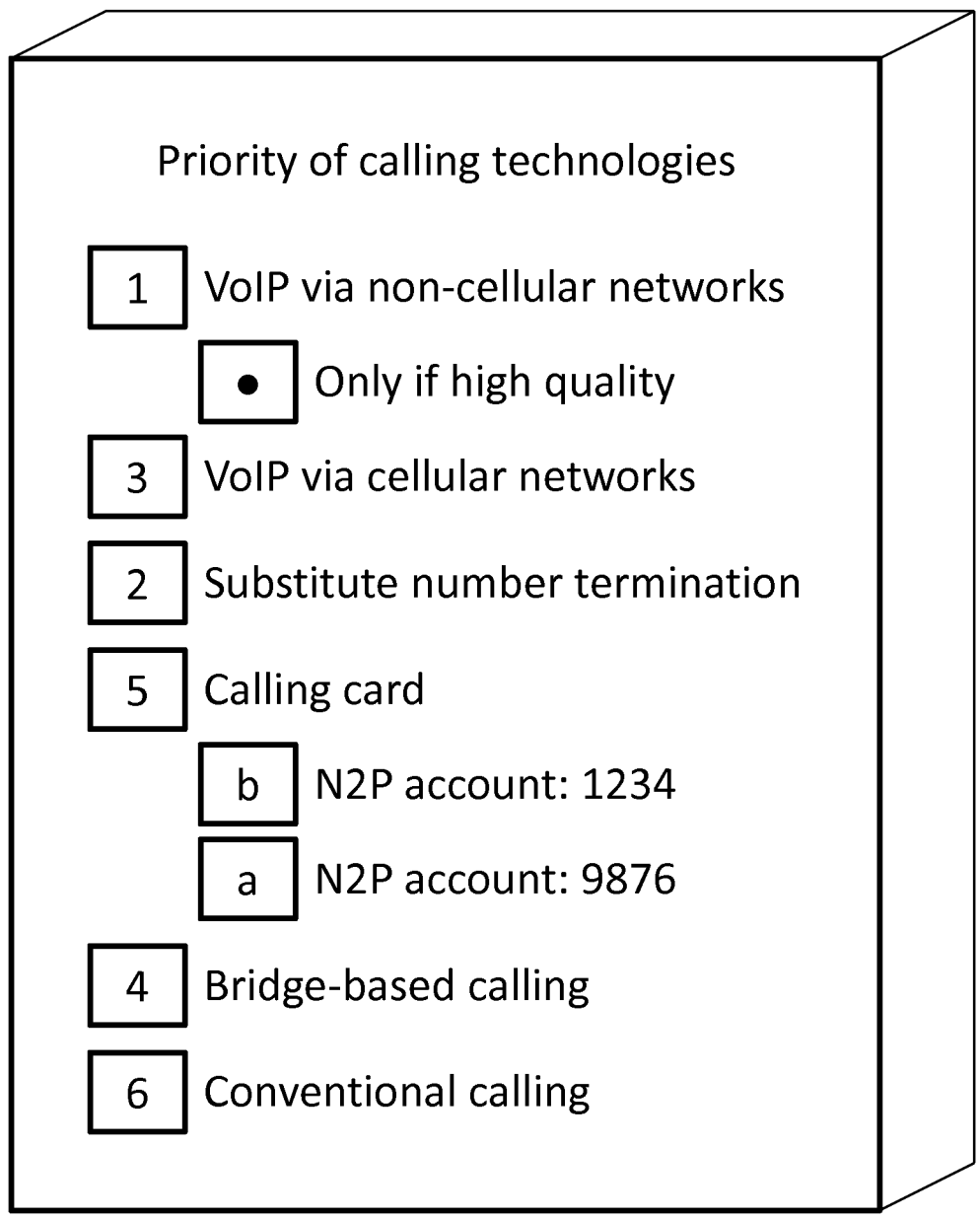
FIG. 6 is a second exemplary interface for a mobile communications device for specifying relative priorities of call routing.

As described above, the routing of calls can be performed using a number of different technologies. In order to accommodate varying telephone and data calling plans, the mobile phone application 100 can including an interface, such as shown in FIGS. 5 and 6, which enable a user to specify a set of preferences which can be used by the routing engine to determine how to route calls. For example, as shown in FIG. 5, a user has selected to allow VoIP calls over non-cellular data networks (e.g., WiFi or WiMax) but to disable VoIP call routing over cellular data networks as a user might wish to do when the user does not have an unlimited data plan. The user has likewise ranked the remaining routing options including specifying two different calling card options. The substitute number termination and bridge-based calling options may also require account numbers (and PINs), which may be the same or different than the account numbers associated with the calling card calling options.

As shown in FIG. 6, the user interface may also include an option for a user to specify a call quality required before allowing calls to be placed over a VoIP connection. For example, a drop down list of call qualities (e.g., high, medium and low) may be provided that a user can select from in addition to a check box which determines if the quality filter is to be turned on. In FIG. 6, the user has also selected to allow VoIP calls to be made over the cellular data network, as a user might do when the user has inexpensive or free data usage on the cellular data network.

Figure 7:
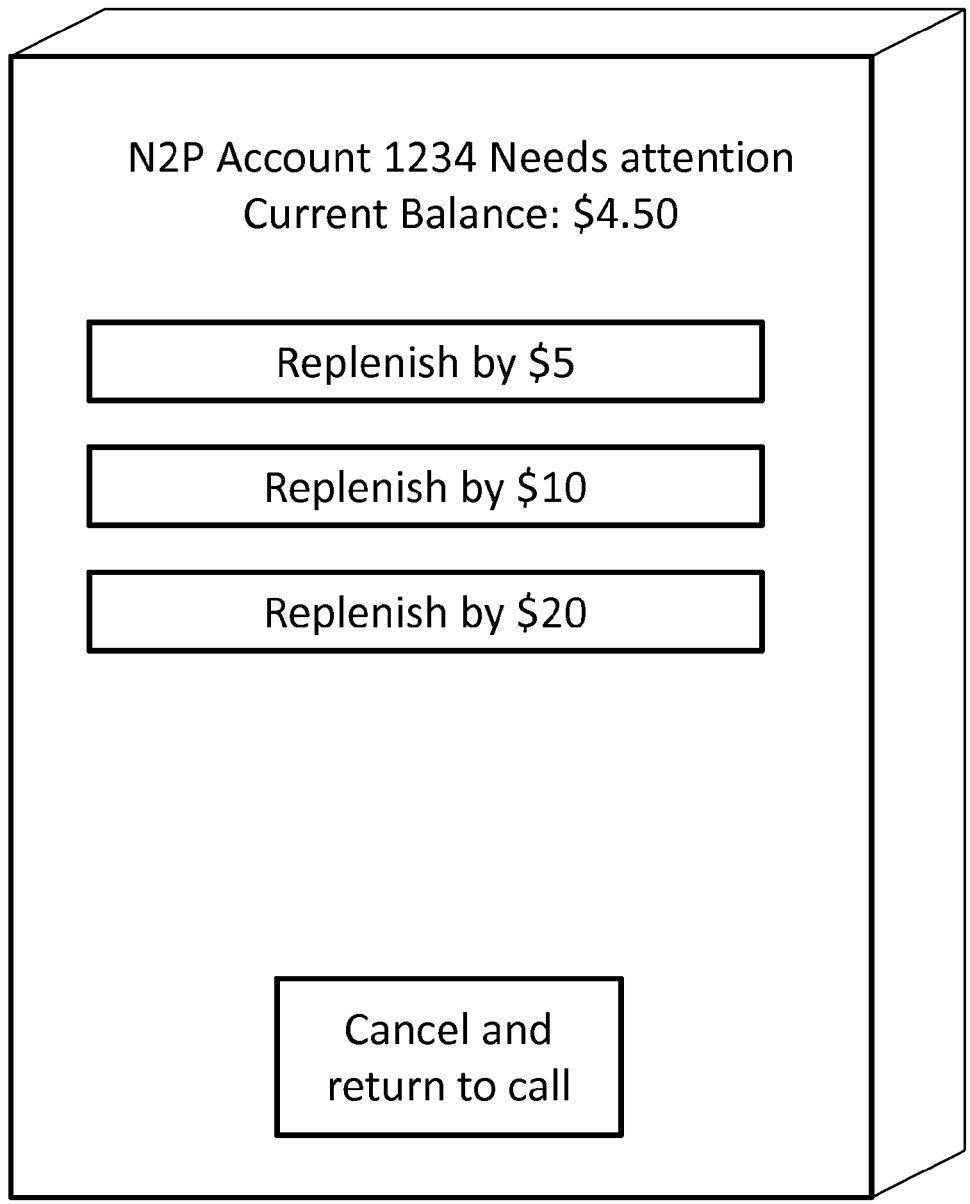
FIG. 7 is a third exemplary interface for a mobile communications device for replenishing an amount of money corresponding to a calling card used by the mobile communications device.

As described above, when using calling card-based routing where the calling card is a pre-paid calling card, the mobile phone application 100 may include a data connection to the calling card platform that allows a user to add additional funds from the interface of the mobile phone application. For example, as shown in FIG. 7, the user may be presented with a series of buttons that specify several amounts by which the user's account can be replenished. The user may receive such an interface prior to, during or after a call that uses the calling card account. Moreover, the same kind of interface can be used for replenishing an account used for substitute number termination routing and bridge-based routing.

In yet another embodiment of the user interface of the mobile phone application, the mobile phone application may prompt the user to specify at call time which of the possible calling technologies should be used (e.g., when multiple calling technologies are similarly priced).

The foregoing description of various embodiments provides illustration and description, but is not intended to be exhaustive or to limit the invention to the precise form disclosed. Modifications and variations are possible in light of the above teachings or may be acquired from practice in accordance with the present invention. It is to be understood that the invention is intended to cover various modifications and equivalent arrangements included within the spirit and scope of the appended claims.

I claim:

1. A method in a mobile communications device for placing a telephone call, comprising:

receiving a destination phone number to call;

automatically determining what types of communications interfaces are available to connect to the destination phone number;

automatically determining first and second call routing methods of the available call routing methods that should be used to place a call to the destination phone number, wherein the first call routing method utilizes a voice connection protocol and the second call routing method utilizes a data connection protocol;

connecting to the destination phone number using a calling card calling method as the first call routing method, the calling card calling method including the steps of:

connecting to a calling card platform using a data connection;

sending to the calling card platform, using the data connection, a phone number of the mobile communications device that will connect to the calling card platform using the voice connection and at least one of an account number and a personal identification number (PIN) and the destination phone number;

connecting to the calling card platform using a voice connection; and sending to the calling card platform, using the voice connection, the phone number of the mobile communications device that will connect to the calling card platform using the voice connection and at least one of the account number, the personal identification number (PIN) and the destination phone number not sent using the data connection; and automatically, when the call to the destination phone number fails using the first call routing method, placing the call and connecting to the destination phone number using the second call routing method.

2. The method as claimed in claim 1, wherein, in addition to the calling card calling method, the available call routing methods comprise at least two methods of the group of methods consisting of: VoIP calling via non-cellular data networks, VoIP calling using cellular-based data networks, substitute number termination, bridge-based calling and cellular voice-based calling.

3. The method as claimed in claim 2, further comprising:
providing a user interface enabling a user to select a relative order of the at least three call routing methods.

4. The method as claimed in claim 1, further comprising the step of storing information on authorizing calling of telephone numbers using at least one calling card platform.

5. The method as claimed in claim 2, further comprising:
selecting a least expensive routing of the at least three calling methods when connecting to the destination phone number.

* * * * *